(12) United States Patent
Fries et al.

(10) Patent No.: US 7,861,273 B2
(45) Date of Patent: Dec. 28, 2010

(54) TV CONTROL RESOURCE MANAGEMENT

(75) Inventors: Robert M. Fries, Redmond, WA (US); Robert S. T. Gibson, Monroe, WA (US); Eric J. Wolz, Bothel, WA (US)

(73) Assignee: Microsoft Corporation, Redmond, WA (US)

( * ) Notice: Subject to any disclaimer, the term of this patent is extended or adjusted under 35 U.S.C. 154(b) by 1405 days.

(21) Appl. No.: 10/133,987

(22) Filed: Apr. 26, 2002

(65) Prior Publication Data

US 2003/0204853 A1 Oct. 30, 2003

(51) Int. Cl.
- H04N 7/18 (2006.01)
- G06F 9/46 (2006.01)
- G06F 3/00 (2006.01)
- G06F 13/00 (2006.01)
- G06F 9/44 (2006.01)
- H04N 7/173 (2006.01)
- H04N 7/16 (2006.01)

(52) U.S. Cl. .............. 725/80; 725/38; 725/58; 725/59; 725/93; 725/141; 725/153; 717/108; 717/116; 717/120; 717/127; 719/321; 719/322; 719/327; 718/100

(58) Field of Classification Search .............. 725/80, 725/38, 58, 59, 93, 141, 153; 717/108, 116, 717/120, 127; 719/321, 322, 327; 718/100
See application file for complete search history.

(56) References Cited

U.S. PATENT DOCUMENTS

| | | | |
|---|---|---|---|
| 4,620,229 A * | 10/1986 | Amano et al. ............... 725/27 |
| 5,657,091 A * | 8/1997 | Bertram ........................ 725/37 |
| 5,737,028 A * | 4/1998 | Bertram et al. ............... 725/37 |
| 6,055,560 A * | 4/2000 | Mills et al. ................... 709/200 |
| 6,133,938 A * | 10/2000 | James ........................... 725/80 |
| 6,240,555 B1 | 5/2001 | Shoff et al. |
| 6,317,885 B1 | 11/2001 | Fries |
| 6,363,434 B1 | 3/2002 | Eytchison |
| 6,618,764 B1 * | 9/2003 | Shteyn ......................... 709/249 |
| 6,665,869 B1 * | 12/2003 | Ellis et al. .................... 725/39 |
| 6,925,500 B1 * | 8/2005 | Mizutani et al. ............. 709/229 |
| 7,028,304 B1 * | 4/2006 | Weinberger et al. ......... 719/310 |
| 2002/0019986 A1 * | 2/2002 | Kikinis ......................... 725/134 |
| 2002/0059623 A1 * | 5/2002 | Rodriguez et al. ........... 725/91 |
| 2003/0121027 A1 * | 6/2003 | Hines ........................... 717/135 |
| 2003/0159157 A1 * | 8/2003 | Chan ............................. 725/151 |

(Continued)

FOREIGN PATENT DOCUMENTS

FR 2 779 595 12/1999

(Continued)

OTHER PUBLICATIONS

Auer, R.; "Zentral gesteuert", 1 page.

(Continued)

*Primary Examiner*—Hoang-Vu A Nguyen-Ba
(74) *Attorney, Agent, or Firm*—Lee & Hayes, PLLC

(57) ABSTRACT

An arbiter component receives a request from a media control object for control of a media resource. The arbiter determines whether a media resource is available, and if a media resource is available, forwards the request to the available media resource. The control object may lock control of the media resource to maintain control of the media resource until the media control unlocks control of the media resource.

35 Claims, 4 Drawing Sheets

U.S. PATENT DOCUMENTS

| | | |
|---|---|---|
| 2003/0172380 A1* | 9/2003 | Kikinis .................... 725/39 |
| 2003/0188320 A1* | 10/2003 | Shing .................... 725/131 |
| 2003/0206719 A1* | 11/2003 | Bumgardner et al. ........ 386/83 |
| 2005/0149984 A1* | 7/2005 | Goodman et al. .......... 725/128 |

FOREIGN PATENT DOCUMENTS

| | | |
|---|---|---|
| FR | 2779595 A1 | 12/1999 |
| GB | 2 247 375 | 2/1992 |
| WO | WO 97 28630 A | 8/1997 |
| WO | WO9728630 A2 | 8/1997 |
| WO | WO03005719 A2 | 1/2003 |

OTHER PUBLICATIONS

Li, Yuanmi, "A Home Multiple—Function AV Receiver/Monitored Control System", 1995 IEEE, 2 pages.

* cited by examiner

US 7,861,273 B2

TV CONTROL RESOURCE MANAGEMENT

TECHNICAL FIELD

This invention relates to a television entertainment system and, in particular, to controlling access to multiple media resources within the system.

BACKGROUND

Television entertainment systems include a plurality of media resources, for example, one or more tuners for receiving media content that is being broadcast, and one or more video ports for displaying media content. A basic television may have one tuner and one video port, allowing a user to view media being broadcast on only one channel at a time. A television entertainment system that includes one video port, two tuners, and a recording device (e.g., digital video recorder (DVR) hardware) provides more options. For example, a user may be able view media being broadcast on one channel (using the video port and one tuner), while recording media being broadcast on another channel, by allowing the DVR to control the second tuner.

Television entertainment systems with multiple media resources (e.g., tuners and video ports) and a plurality of devices capable of controlling the media resources (e.g., media recording devices, interactive game systems, etc.) are becoming commonplace, and can lead to undesired behavior. For example, if an entertainment system has one tuner and two recording devices, a user may program the first recorder to begin recording a two-hour movie on channel 2 at 3:00 pm. The user may program the second recorder to begin recording a half-hour sitcom on channel 4 at 3:30 pm. In this example the first recorder controls the tuner from 3:00 pm until 3:30 pm. At 3:30 pm, a decision must be made as to whether to allow the first recorder to continue recording the movie or stop the first recorder and allow the second recorder to record the half-hour sitcom.

Accordingly, there is a need to manage a growing number of media resources within an entertainment system, and thus manage the behavior of the system.

SUMMARY

Systems and methods for controlling access to media resources within a television entertainment system are described. A client device within a television system includes one or more media resources that may be controlled by one or more instances of TV controls. An arbiter component monitors and facilitates access to and control of the media resources.

BRIEF DESCRIPTION OF THE DRAWINGS

The same numbers are used throughout the drawings to reference like features and components.

DETAILED DESCRIPTION

The following discussion is directed to systems for controlling access to media resources within a television entertainment system. A television entertainment system may include a plurality of media resources (e.g., tuners and video ports) that can be controlled by one or more functional objects within a client device or by one or more distributed client devices. An example functional object within a client device is a digital video recorder implemented as part of a television set-top box. Other example client devices within a television entertainment system may include a television, a set-top box, a video cassette recorder (VCR), a digital video disc (DVD) player, and a digital video recorder (DVR). One or more tuners and one or more video ports may be included as part of a device (e.g., a television or a set-top box). Client devices control media resources when performing device-specific functions. For example, a DVR controls a tuner when recording a program that is being broadcast. The DVR controls a video port when playing a program that was previously recorded. A television controls both a tuner and a video port when displaying a program that is being broadcast on a particular channel.

Figure 1:
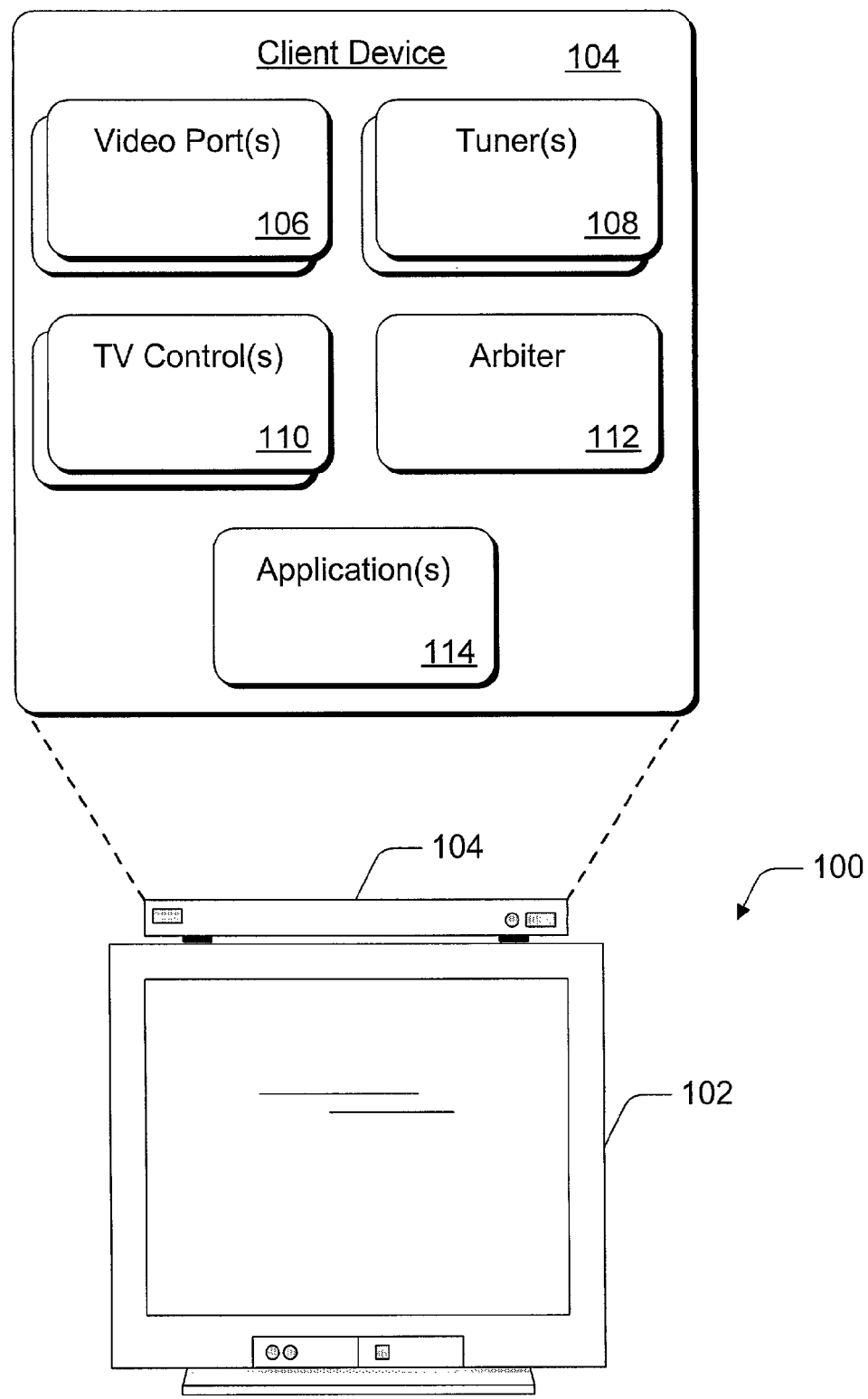
FIG. 1 illustrates an exemplary environment in which a system that controls access to media resources may be implemented.

FIG. 1 illustrates an exemplary environment in which a system that controls access to media resources may be implemented. Exemplary environment 100 includes a television 102 and a client device 104. Client device 104 includes one or more media resources including, for example, one or more video ports 106 and one or more tuners 108. Video ports 106 are media resources that facilitate the display of video content. Tuners 108 are media resources that facilitate the reception of broadcast media by tuning, for example, to a particular broadcast channel.

Client device 104 is also equipped with one or more TV controls 110 and an arbiter 112. TV controls 110 are software objects that may be instantiated by a client device, for example, a VCR, a television, a DVD player, or a DVR. TV controls 110 are objects that may have access to or control of one or more media resources. A TV control has an associated state that indicates the type of media resources the TV control has access to. Arbiter 112 is a module that monitors and facilitates access to and control of the video ports 106 and tuners 108 by the TV controls 110.

Client device 104 optionally includes one or more applications 114. Applications 114 may include, for example a DVR application that can communicate with the arbiter 112, instantiate TV controls 110, and control one or more video ports 106 and/or tuners 108.

Figure 2:
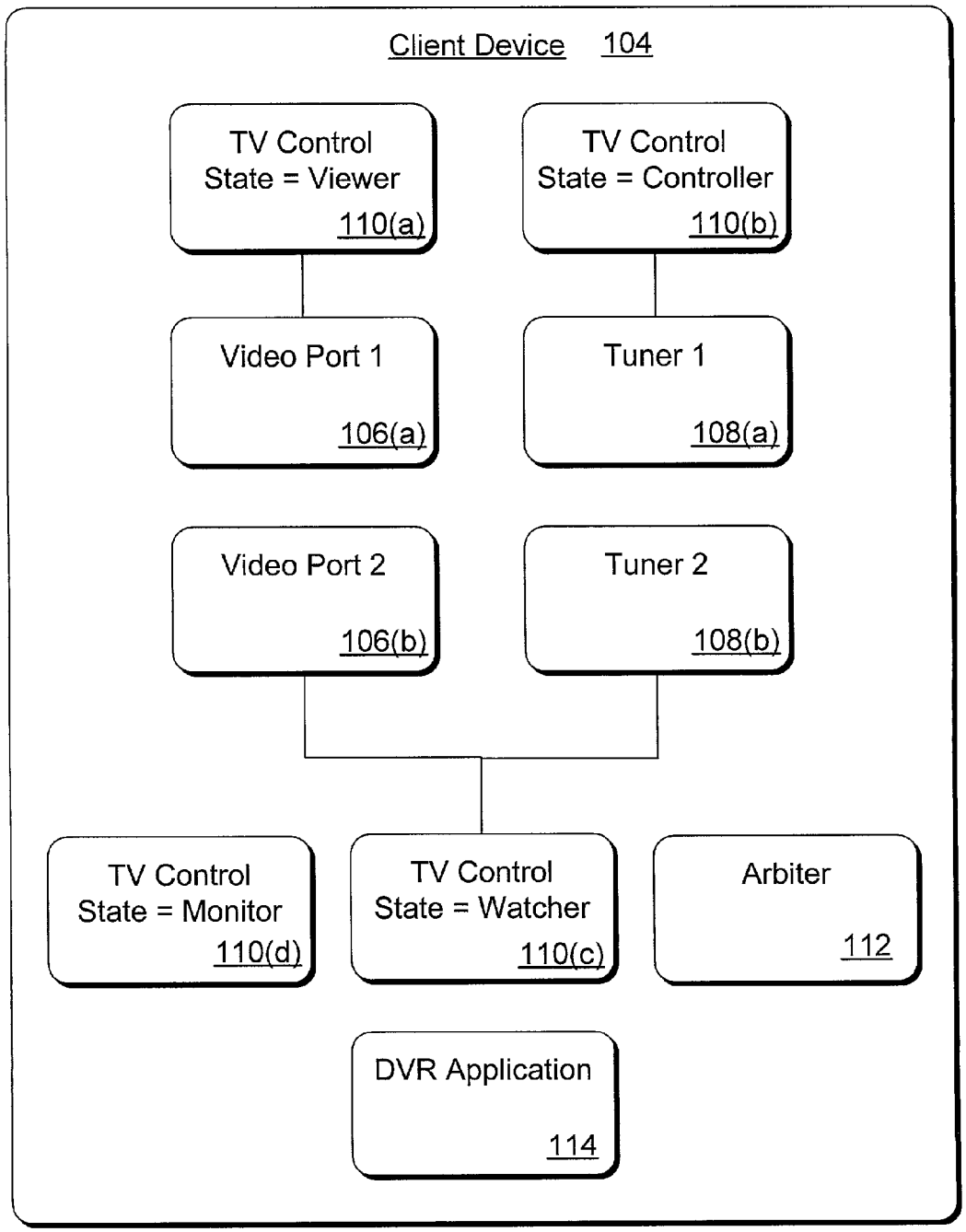
FIG. 2 illustrates TV controls of various states within a client device.

FIG. 2 illustrates TV controls of various states within client device 104. This implementation shows the TV controls in four different states: "viewer", "controller", "watcher", and "monitor". Client device 104 includes two video ports 106(a) and 106(b) and two tuners 108(a) and 108(b).

A TV control in the "viewer" state, as represented by TV control 110(a) has access to and controls a video port, as represented by video port 106(a). For example, DVR application 114 may instantiate a TV control in the "viewer" state to facilitate playing a pre-recorded tape.

A TV control in the "controller" state, as represented by TV control 110(b) has access to and controls a tuner, as represented by tuner 108(a). For example, DVR application 114 may instantiate a TV control in the "controller" state to facilitate recording a program that is being broadcast on a television channel while the television is either off or is tuned to another channel. Because the DVR is capable of recording the program received through a tuner without displaying the same program through a video port, the associated TV control does not need to control a video port.

A TV control in the "watcher" state, as represented by TV control 110(*c*) has access to and controls both a tuner and a video port, as represented by tuner 108(*b*) and video port 106(*b*), respectively. For example, a television set may instantiate a TV control in the "watcher" state to facilitate displaying a program that is currently being broadcast on a particular channel.

A TV control in the "monitor" state, as represented by TV control 110(*d*), is able to monitor both tuners and video ports, as represented by tuners 108(*a*) and 108(*b*) and video ports 106(*a*) and 106(*b*), but does not control a media resource. A TV control monitor allows one program module to receive notification of events that occur in another program module. For example, a user interface module may use a TV control monitor object to receive notification of an On Tuner Acquired event when a program module, such as a DVR application 114 receives a particular tuner.

One type of TV control monitor is able to listen to activity associated with one or more specific resources (e.g., a tuner). The TV control does not request any resources; it listens to activity associated with a specific resource or set of resources.

Another type of TV control monitor represents a "collection" of all the TV controls in the system. Events occurring in association with resources are signaled through this collection object. Arbiter 112 may use the TV control "collection" object to listen to and act upon resource requests.

Arbiter 112 monitors video ports 106 and tuners 108, and processes requests for control of media resources from TV controls 110. For example, if a new TV control is instantiated that requests access to and control of a video port, arbiter 112 receives the request. Arbiter 112 then determines whether to allow TV control 110(*a*) to continue to control video port 1 106(*a*) and whether to allow TV control 110(*c*) to continue to control video port 2 106(*b*). The arbiter 112 may request that either TV control 110(*a*) relinquish control of video port 1 106(*a*) or TV control 110(*c*) relinquish control of video port 2 106(*b*) so that the newly instantiated TV control can control video port 1 106(*a*) or video port 2 106(*b*), respectively.

For example, a television entertainment system may include a television and a set-top box with one tuner and two video ports. The two video ports enable the set-top box to output two video signals, possibly including other static graphics, to the input of the television, which may have two display regions (e.g., picture-in-picture). Software running on the set-top box allows playback of programs recorded by DVR software in the set-top box, and tuning to broadcast channels using the tuner. The system is able to decode multiple DVR programs at once, and can playback DVR programs in either of the video regions. One of the video regions could instead be used for live video received through the tuner. It is not necessary for both video regions to be viewed at once, but there is a maximum of two video regions that can be visible at one time. For example, a user may want to watch playback of a recorded show in the main television display region, while watching a live broadcast in a smaller picture-in-picture (PIP) window. The two television display regions are associated with the two available video ports. If a user decides to watch a second recorded DVR program in the PIP window instead of the live broadcast, control of one of the video ports must be re-assigned from the television to the DVR. A DVR playback module requests the video port from a live broadcast module to gain control of the video port in order to display the second recorded DVR program in the PIP window.

Figure 3:
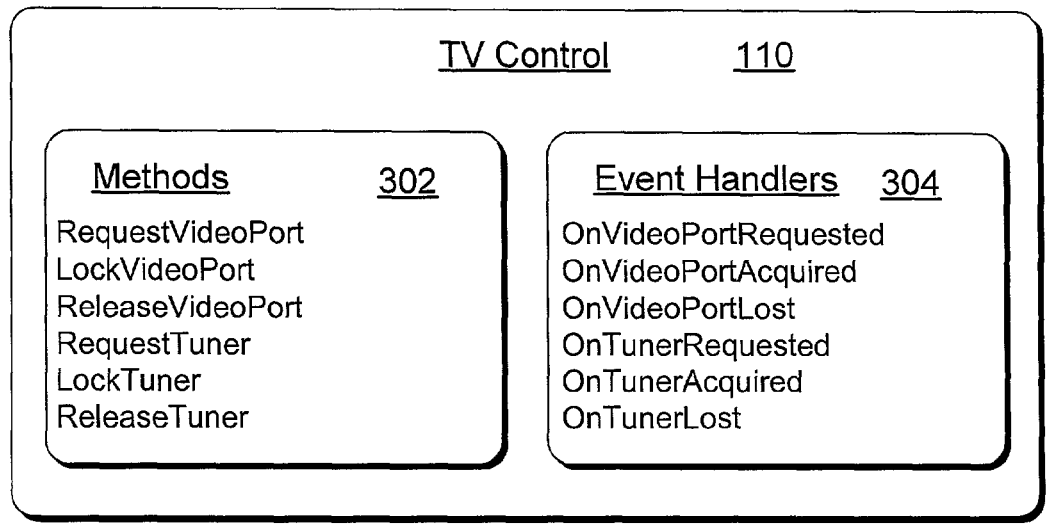
FIG. 3 is an example block diagram illustrating example methods and event handlers that may be implemented as part of a TV control.

FIG. 3 illustrates one exemplary TV control in more detail. The TV control is implemented to include methods for requesting, locking, and releasing media resources and event handlers that define the TV control's behavior in response to particular events. Examples of possible methods 302 used in TV control 110 include: RequestVideoPort, LockVideoPort, ReleaseVideoPort, RequestTuner, LockTuner, and ReleaseTuner. Examples of possible event handlers used in TV control 110 include: OnVideoPortRequested, OnVideoPortAcquired, OnVideoPortLost, OnTunerRequested, OnTunerAcquired, and OnTunerLost.

To gain access to and control of a video port or tuner, a TV control executes the RequestVideoPort method or the RequestTuner method, respectively. For example, when a user signals a DVR to play a recorded program, the TV control instantiated by the DVR executes the RequestVideoPort method of the TV control to gain access to and control of a video port so that the recorded program can be displayed. In one implementation, the RequestVideoPort (or RequestTuner) method sends a request for control of a video port (or tuner) to the arbiter component 112. In an alternate implementation, the method sends the request directly to one or more video ports.

Additional data can be passed along with the request in a code parameter. This data may be a string, a number, or another object that the arbiter or destination TV control object can use to identify the purpose of the request and aid in resolving resource conflicts. The code parameter may be further passed through the OnVideoPortRequested and OnTunerRequested event handlers.

To lock a video port or tuner, a TV control executes the LockVideoPort method or the LockTuner method, respectively. For example, when a user signals a DVR to record a program, the TV control instantiated by the DVR may execute the LockTuner method to prevent any other TV control from forcing the TV control instantiated by the DVR to relinquish control of the tuner before the program is entirely recorded. This functionality may prevent a user from accidentally changing the channel to which the tuner is tuned while the DVR is in the record mode, resulting in an undesired recording. A TV control can set a lock flag as part of a request for a resource. If the resource is not immediately available, the request may remain pending until the resource is available. The lock flag indicates that the TV control it to be locked as the owner of the resource immediately after the resource is assigned to the TV control.

To release a video port or tuner, a TV control executes the ReleaseVideoPort method or the ReleaseTuner method, respectively. For example, when a signals a DVR to end a recording, the TV control instantiated by the DVR may execute the ReleaseTuner method, releasing the tuner controlled by the TV control instantiated by the DVR and making the tuner available for control by another TV control. When the Release function is called, the arbiter 112 is notified. If there is a pending request that can be filled using the released resource, the requesting object will be given control of resource. In this example, the arbiter 112 receives notification of a LostVideoPort or LostTuner event for one TVcontrol and receives notification of an AcquiredVideoPort or AcquiredTuner event for another TV control.

Methods 302 described above are executed by a TV control to perform a particular task (e.g., request a video port or tuner, lock a video port or tuner, or release a video port or tuner). In contrast, event handlers 304 are executed by a TV control in response to a particular event. An OnVideoPortRequested event handler implemented as part of TV control 110 includes instructions that are executed when the TV control requests a video port.

For example, a user may be watching a channel that is currently being recorded by a DVR on a single-tuner system. When the user tries to change the channel, the TV control associated with the television is responsible for tuning and viewing, and needs control of the tuner. The tuner is controlled and locked by the TV control associated with the DVR that is recording. The TV control associated with the television issues a RequestTuner method and may pass "Main TV" as a code. This request is sent to the TV control associated with the DVR as the OnTunerRequested event. The TV control associated with the DVR examines the code passed with the request and determines whether to release the tuner. The TV control associated with the DVR may ignore the request, in which case the channel being viewed by the user will not change. Alternatively, the TV control associated with the DVR may send a message instructing a user interface program module to display a message on the screen indicating that the user cannot change the channel because a program is currently being recorded by the DVR.

An OnVideoPortAcquired event handler implemented as part of TV control 110 includes instructions that are executed when the TV control gains access to and control of a video port. For example, when TV control 110 executes the RequestVideoPort method, the OnVideoPortRequested event handler is also executed. When, in response to executing the RequestVideoPort method, TV control 110 gains control of a video port, the OnVideoPortAcquired event hander is executed.

For example, in a single-tuner system, a user may be channel surfing when the DVR is scheduled to begin a recording. The DVR program module creates a new instance of a TV control that requires locked control of the tuner in order to perform the scheduled record. The TV control associated with the DVR calls the RequestTuner method. If the TV control that is currently controlling the tuner does not have the tuner locked, control of the tuner is automatically assigned to the TV control associated with the DVR (i.e., the TV control that called the RequestTuner method). In the OnTunerAcquired event handler, the TV control associated with the DVR issues a command to tune to the appropriate channel and prepare to start recording.

An OnVideoPortLost event handler implemented as part of TV control 110 includes instructions that are executed when the TV control loses control of a video port. For example, when TV control 110 executes the ReleaseVideoPort method and control of the video port is successfully relinquished, the OnVideoPortLost event handler is executed. An OnTunerRequested event handler, an OnTunerAcquired event handler, and an OnTunerLost event handler are implemented similarly.

For example, if the DVR is recording a channel, then a TV control associated with the DVR has control of, and may have locked, the tuner. If an event from an emergency alert system (EAS) is detected, the set-top box may be directed to tune to another channel for emergency broadcast information. An EAS program module creates an instance of a TV control and requests locked control of the tuner. The TV control associated with the DVR receives the request and releases the tuner. When the resource is assigned to the TV control associated with the EAS module, the DVR receives notification of an OnTunerLost event. The DVR may use this event notification as a signal to stop recording.

In one implementation, TV controls 110 communicate directly with the media resources (e.g., video ports 106 and tuners 108). In another implementation, an arbiter component 112 facilitates communication to and from the TV controls 110 and determines how media resources are allocated.

Figure 4:
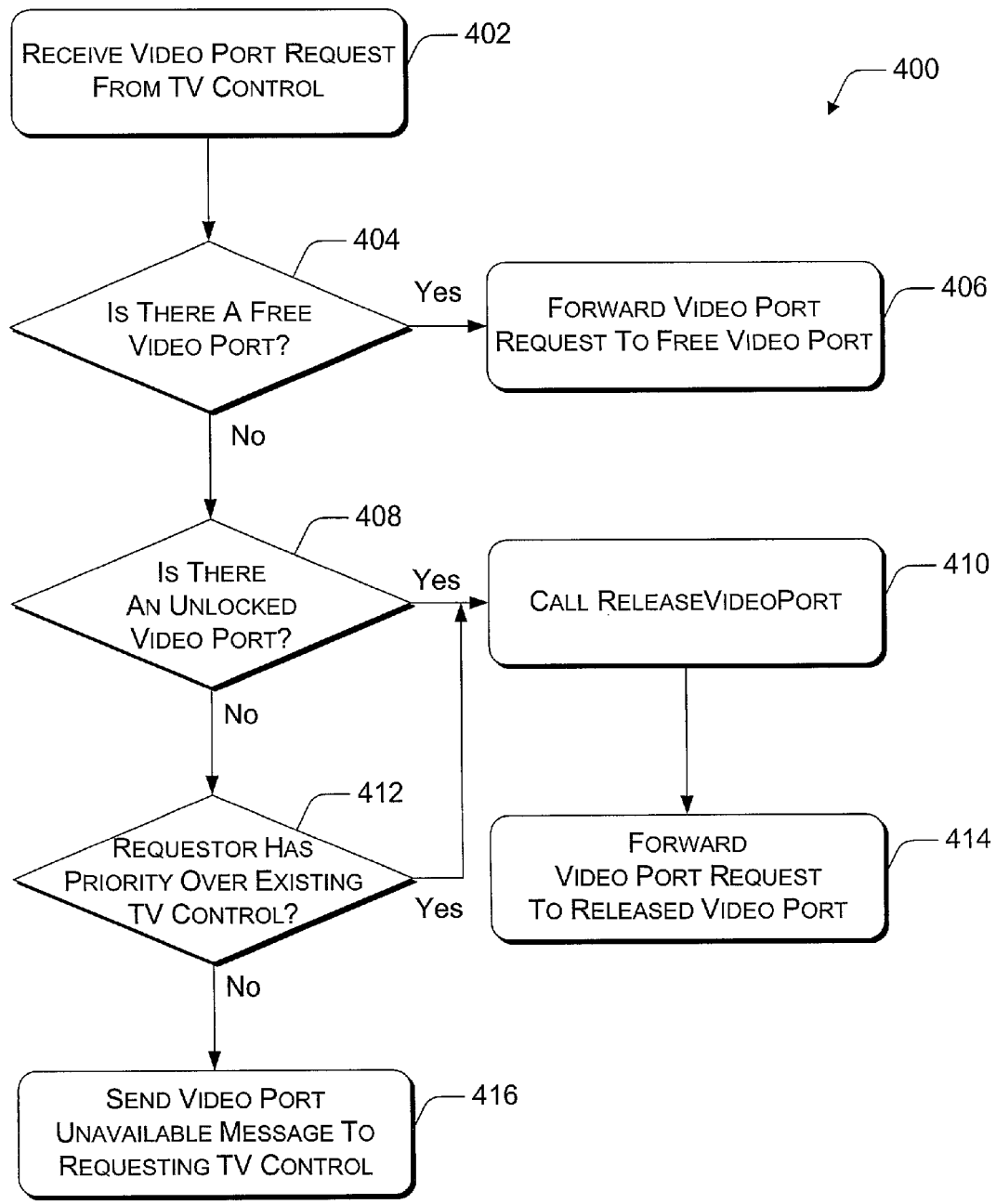
FIG. 4 is an example flow diagram of video port allocation performed by an arbiter component.

FIG. 4 is an example flow diagram of video port allocation performed by an arbiter component. At block 402, an arbiter component receives a request from a TV control for access to and control of a video port. For example, TV control 110(*a*) executes a RequestVideoPort method, sending a request to arbiter 112 for control of a video port.

At block 404, the arbiter component determines whether there is an available video port to satisfy the request. If there is an available video port (i.e., the "yes" branch from block 404), the arbiter component forwards the video port request to the available video port (block 406). For example, if video port 1 106(*a*) is available when arbiter 112 receives a request via a RequestVideoPort method from TV Control 110(*a*), then arbiter 112 forwards the video port request to video port 1 106(*a*).

If there are no available video ports when the arbiter receives a video port request (i.e., the "no" branch from block 404), the arbiter determines whether there is a video port that is being controlled by another TV control, but is not locked (block 408). If there is a video port that is controlled, but is not locked (i.e., the "yes" branch from block 408), the arbiter calls the ReleaseVideoPort method of the controlling TV control (block 410). Then, at block 414, when the TV control that has control of the unlocked video port releases the video port, the arbiter forwards the video port request to the released video port.

For example, referring to FIG. 2, TV control 110(*a*) has control of video port 1 106(*a*), but assume it does not have it locked. If arbiter 112 receives a video port request from a newly instantiated TV control (not shown), the arbiter 112 may call the ReleaseVideoPort method of TV control 110(*a*), forcing it to relinquish control of video port 1 106(*a*). The arbiter 112 may then forward the video port request received from the newly instantiated TV control to video port 1 106(*a*).

If the arbiter determines that there are no unlocked video ports (i.e., the "no" branch of block 408), the arbiter determines whether the requesting TV control has priority over a TV control currently controlling a video port. If the arbiter determines that the requesting TV control does have priority over a TV control currently controlling a video port (i.e., the "yes" branch from block 412), the process continues at block 410 as described above. The arbiter may determine priority based on a code passed by a TV control as part of a request.

If the arbiter determines that the requesting TV control does not have priority over a TV control currently controlling a video port (i.e., the "no" branch from block 412), then the arbiter generates and sends a message indicating that there are no available video ports to the requesting TV control.

Tuner allocation may be performed by an arbiter component in the same way that video port allocation is described with reference to FIG. 4.

CONCLUSION

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A media system comprising:
   a first client device, the first client device including one or more media resources to receive and display media content;
   first and second media controls, the first media control implemented as a software object instantiated within the first client device by a second, physically distinct client device, each of the first and second media controls instantiated to monitor or control individual ones of the one or more media resources, the first media control including:
     a state indicating a type of media resource the first media control has access to, the state being selected from a group of states comprising:
       a viewer state whereby the first media control has control of a video port;
       a controller state whereby the first media control has control of a tuner;
       a watcher state whereby the first media control has control of both the tuner and the video port; and
       a monitor state whereby the first media control monitors one or more of the media resources without controlling the media resources;
     one or more methods that are executable to perform method-specific tasks; and
     one or more event handlers that are executable in response to particular events; and
   an arbiter to facilitate access to and control of the one or more media resources by the first and second media controls, such that the first media control requests control of a media resource on behalf of the second client device.

2. The media system as recited in claim 1 wherein the one or more media resources comprise at least one of the tuner or the video port.

3. The media system as recited in claim 1 wherein:
   the first client device comprises at least one of a television, a digital video disc player, a television set-top box, a digital video recorder, a video cassette recorder, or a television set-top box with an integrated digital video recorder; and
   the second client device comprises at least one of a television, a digital video disc player, a television set-top box, a digital video recorder, a video cassette recorder, or a television set-top box with an integrated digital video recorder.

4. The media system as recited in claim 1 wherein the arbiter, upon receiving a request for control of one of the media resources from the first media control, determines that the media resource is available and forwards the request to the media resource.

5. The media system as recited in claim 1 wherein the arbiter, upon receiving a request for control of one of the media resources from the first media control, determines that the media resource is not available and prevents the request from being forwarded to the media resource.

6. The media system as recited in claim 1, wherein
   the arbiter, upon receiving a request for control of one of the media resources from the first media control, determines that the media resource is controlled by the second media control, and causes the second media control to relinquish control of the media resource to facilitate the first media control to obtain control of the media resource.

7. The media system as recited in claim 6 wherein the arbiter further determines that the first media control has a higher priority than the second media control in reference to controlling the media resource.

8. A method comprising:
   handling, by a media device configured to provide entertainment system control resource management, media content via one or more media resources, each media resource having an associated media resource type; and
   arbitrating, by the media device, access to and control of the media resources by one or more of a plurality of software control objects, each instantiated as a media control to access and control the media resources on behalf of a physically distinct client device, each of the software control objects comprising methods and event handlers, wherein each of the software control objects has an associated state that indicates the media resource type of a media resource that the software control object has access to, the state being selected from a group of states comprising: viewer, controller, watcher, and monitor.

9. The method as recited in claim 8 wherein the media resource type comprises one of video port or tuner.

10. The method as recited in claim 8 wherein each of the media controls is associated with at least one of a television, a digital video disc player, television set-top box, a digital video recorder, a video cassette recorder, or a television set top box with an integrated digital video recorder.

11. The method of claim 8 wherein the arbitrating comprises:
    receiving, by the media device, a request from one of the media controls for control of a media resource type;
    determining, by the media device, whether a media resource of the media resource type is available from among the one or more media resources; and
    in an event that a media resource of the media resource type is available, forwarding, by the media device, the request from the media control to the media resource of the media resource type that is available.

12. The method as recited in claim 11 wherein the media resource type comprises one of video port or tuner.

13. The method as recited in claim 11, further comprising:
    in an event that a media resource of the media resource type is controlled by a second one of the media controls, preventing, by the media device, the request from being forwarded to the media resource.

14. The method as recited in claim 11, further comprising:
    in an event that a media resource of the media resource type is controlled by a second one of the media controls, causing, by the media device, the second media control to relinquish control of the media resource.

15. The method as recited in claim 11, further comprising:
    in an event that a media resource of the media resource type is controlled by a second one of the media controls, determining, by the media device, a media control priority associated with the media control, relative to the second media control; and
    in an event that the media control priority indicates that the media control has a higher priority than the second media control, causing, by the media device, the second media control to relinquish control of the media resource.

16. The method as recited in claim 8 wherein each of the media controls is associated with a television, a digital video disc player, a television set-top box, a digital video recorder, a video cassette recorder, or a television set top box with an integrated digital video recorder.

17. A method comprising:
receiving, by a first client device configured to provide entertainment system control resource management, a request, on behalf of a second client device, from a first media control for control of a media resource, wherein:
the first media control comprises a software control object instantiated by the second client device;
the first media control comprises an associated state indicating a type of media resource the first media control has access to;
the software control object is instantiated in the first client device;
the software control object comprises methods and event handlers; and
control of the media resource by the software control object, on behalf of the second client device, is facilitated by the methods and event handlers;
determining, by the first client device, whether the media resource is available; and
in an event that the media resource is available, forwarding, by the first client device, the request from the first media control to the media resource.

18. The method as recited in claim 17, wherein the first client device comprises at least one of a television, a digital video disc player, television set-top box, a digital video recorder, a video cassette recorder or a television set top box with an integrated digital video recorder.

19. The method as recited in claim 17, wherein the media resource comprises at least one of a video port or a tuner.

20. The method as recited in claim 17, further comprising:
receiving, by the first client device, a second request for control of the media resource, on behalf of a third, physically distinct, client device, from a second media control, wherein the second media control comprises a software control object instantiated by the third, physically distinct, client device;
determining, by the first client device, that the media resource is controlled by the first media control;
causing, by the first client device, the first media control to relinquish control of the media resource; and
forwarding, by the first client device, the second request to the media resource.

21. The method as recited in claim 20, further comprising:
determining, by the first client device, that the second media control has a higher priority than the first media control.

22. The method as recited in claim 17, further comprising:
receiving, by the first client device, a second request for control of the media resource from a second media control;
determining, by the first client device, that the media resource is controlled by the first media control;
determining, by the first client device, that the media resource is locked by the first media control; and
preventing, by the first client device, the second request from being forwarded to the media resource.

23. A computing system encoded with computer executable instructions that, when executed, direct a media system to perform operations comprising:
receiving from a media control object, a request for control of a type of media resource, wherein the media control object comprises a software control object instantiated by a first client device, wherein the media control object has an associated state that indicates the type of media resource the media control object has access to, the state being selected from a group of states comprising: viewer, controller, watcher, and monitor;
determining an available media resource of the type; and
forwarding the request to the available media resource.

24. The computing system as recited in claim 23, wherein the type of media resource comprises at least one of video port and tuner.

25. The computing system as recited in claim 23, wherein the method further comprises:
receiving from a media control object, a second request for control of the type of media resource;
identifying a media resource of the type that is not available;
causing the media resource that is not available to become available; and
forwarding the second request to the media resource that has been caused to become available.

26. A computing system encoded with computer executable instructions that, when executed, direct a computing system to perform a method, the method comprising:
receiving a request for control of a media resource from a first media control, wherein:
the first media control comprises a software object resident in the computing system;
the first media control is instantiated by a client device that is physically distinct from the computing system;
the first media control has an associated state that indicates a type of media resource the first media control has access to, whereby the state is viewer, controller, watcher or monitor;
determining whether the media resource is controlled by another media control; and
in an event that the media resource is not controlled by another media control, facilitate the first media control to control the media resource.

27. The computing system as recited in claim 26, wherein the media resource comprises at least one of a video port or a tuner.

28. The computing system as recited in claim 26, wherein the client device comprises at least one of a television, a digital video disc player, television set-top box, a digital video recorder, a video cassette recorder, or a television set top box with an integrated digital video recorder.

29. The computing system as recited in claim 26, wherein the method comprises:
receiving a second request for control of the media resource from a second media control;
determining that the media resource is controlled by the first media control;
causing the first media control to relinquish control of the media resource; and
facilitating the second media control to control the media resource.

30. The computing system as recited in claim 29, wherein the method comprises:
determining that the second media control has a higher priority than the first media control with reference to controlling the media resource.

31. The computing system as recited in claim 26, wherein the method further comprises:
receiving a second request for control of the media resource from a second media control;
determining that the media resource is controlled by the media control; and
preventing the second media control from obtaining control of the media resource.

32. A media system comprising:
a first client device, the first client device comprising:
- one or more media resources to receive and display media content;
- first and second media controls, each implemented as a software object, to access and control the one or more media resources, the first and second media controls each comprising:
  - an associated state indicating a type of media resource the media control has access to, the state being selected from a group of states comprising: viewer, controller, watcher, and monitor;
  - one or more methods that are executable to perform method-specific tasks; and
  - one or more event handlers that are executable in response to particular events,
  - wherein the first media control software object is instantiated within the first client device by a second, physically distinct, client device; and
- an arbiter, using a third media control implemented as a software object in a monitor state, to facilitate access to and control of the one or more media resources by the first and second media controls, such that the first media control requests access to and control of a media resource on behalf of the second client device.

33. The media system recited in claim 32, wherein the second media control software object is instantiated within the first client device by the first client device.

34. The media system recited in claim 32, wherein the monitor state facilitates a media control to perform functions comprising:
- notifying one program module of events that occur in another program module; and
- listening to activity associated with the one or more media resources.

35. The media system recited in claim 32, wherein the monitor state facilitates a media control to perform functions comprising:
- providing a collection object that listens to and acts upon requests made by the first and second media controls to the one or more media resources, wherein events occurring in association with the one or more media resources are signaled through the collection object.

* * * * *